G. H. Spaulding.
Moulding Collars.
N° 78242. Patented May 26, 1868.
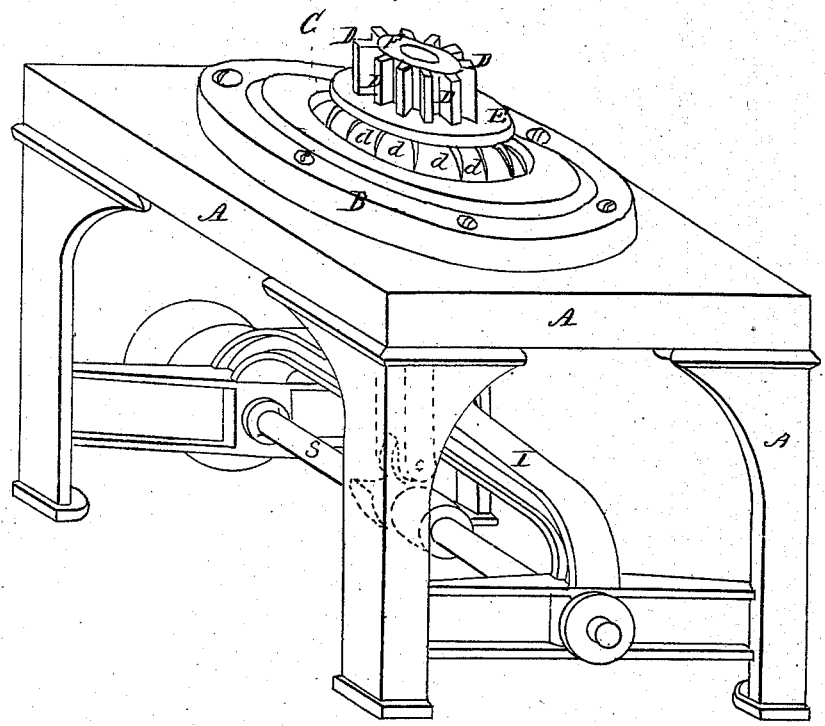
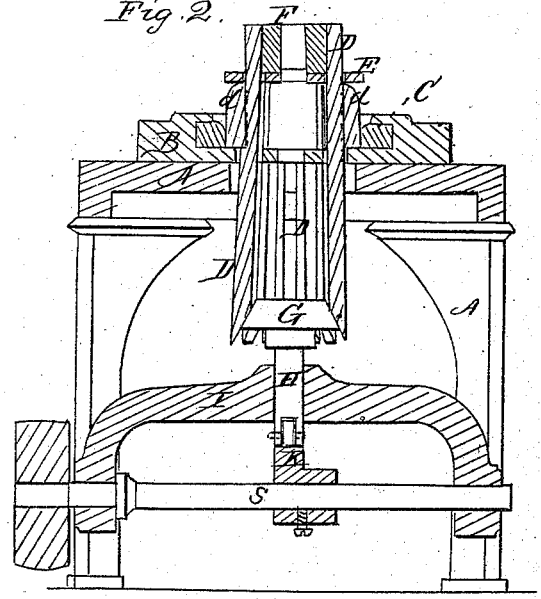
Witnesses
Jos. H. Noble
M. S. G. Wilde.
Geo. H. Spaulding
by J. H. Adams
Atty

United States Patent Office.

GEORGE H. SPAULDING, OF NORWICH, CONNECTICUT, ASSIGNOR TO AMERICAN MOULDED-COLLAR COMPANY, OF BOSTON, MASSACHUSETTS.

Letters Patent No. 78,242, dated May 26, 1868.

IMPROVEMENT IN MACHINES FOR MOULDING COLLARS.

The Schedule referred to in these Letters Patent and making part of the same.

Be it known that I, GEORGE H. SPAULDING, of Norwich, in the county of New London, and State of Connecticut, have invented a new and useful Improvement in Machines for Moulding Collars, of which the following is a full, clear, and exact description, reference being had to the accompanying drawings, making a part of this specification, in which—

Figure 1 represents a perspective view of a machine embodying my improvement; and Figure 2 is a vertical section of the same.

The object of my invention is to mould a collar to the proper shape, without puckering or wrinkling the same, and at the same time to hold the collar firmly in position while being moulded, without the necessity of otherwise clamping it at the ends; and the invention consists in the use or employment of a ring or bed of India rubber or other suitable elastic material, placed within a frame or proper support; and, in combination with such an elastic ring or bed, of a former which may be stationary, and made to expand, or it may be of tapering form, and made to move vertically within the said ring or bed, or the ring or bed may be made to move within a stationary former.

In moulding collars, when the pressure-surfaces are of a hard or inelastic material, the grain or fibres of the material of which the collar consists are liable to become displaced or disarranged, thus presenting an uneven surface and irregular thickness, but in my invention the friction of the India rubber holds the collar firmly, and presses it evenly throughout its entire length, thus causing it to be evenly stretched, and preventing the fibres from being displaced, and insuring an even thickness, and a smooth, unbroken surface on the collar.

Referring to the drawings, A represents the frame of the machine, on the top of which is secured a circular block or frame, B, having a central opening, and on its inner side a recess, in which is fitted a ring or bed of India rubber or other suitable elastic material, C. D D represent a series of bars of wood or other suitable material, arranged in a circle, and confined within a ring, E. These bars extend downwards within the frame, as shown in fig. 2. Just below the ring E are blocks or pieces d d, of the form shown, attached to each of the bars D, and when in their normal position, are nearly in contact with the rubber ring C, a sufficient space being left between the two for the insertion of a collar.

Within the upper portion of the series of bars D, is a block or ring of India rubber, F, which serves to keep the said upper portions of the bars in place, or to retain them in place after having been distended at their lower ends. The inner ends of the lower portions of the bars D are bevelled, as shown in fig. 2, and rest upon a bevelled block or ring, G, which is set upon a bar, H. The bar H extends downwards through a cross-piece, I, in which it slides freely, and on its lower end is a roller, h, which latter is supported upon a crane, K, attached to the shaft S.

The operation is as follows:—The collar to be moulded is placed between the projecting portions d of the bars D and the India-rubber ring or bed C, the bars being kept in a vertical position, by means of the rubber block F, and the bevelled wheel or block G being also depressed to the point of coincidence with the bevelled ends of the bars. The shaft S being then turned, the cam K elevates the bar H and block G, which latter causes the lower portion of the bars D to distend or spread apart, and thus press the projections d against the India-rubber ring or bed C. The collar is thus firmly held throughout its entire length, and an even pressure applied to the entire moulded surface of the collar.

Instead of the expanding-bars D, a conical or tapering block may be employed, which may be forced up through the opening in the elastic bed C, or the said bed may be made to move upon a stationary former.

Having thus described my invention, what I claim as new, and desire to secure by Letters Patent, is—

The combination, with an expanding former, of an elastic bed or cushion, C, against which the collar is pressed, substantially as shown, and for the purpose described.

In testimony whereof, I have signed my name to this specification in the presence of two subscribing witnesses.

GEO. H. SPAULDING.

Witnesses:
J. H. ADAMS,
JAMES A. WOODBURY.